(12) United States Patent
Klem

(10) Patent No.: US 8,583,514 B2
(45) Date of Patent: Nov. 12, 2013

(54) SYSTEM AND METHOD FOR TRACKING INFORMATION IN A BUSINESS ENVIRONMENT

(76) Inventor: Jeffrey Brian Klem, Laguna Hills, CA (US)

( * ) Notice: Subject to any disclaimer, the term of this patent is extended or adjusted under 35 U.S.C. 154(b) by 2550 days.

(21) Appl. No.: 10/918,037

(22) Filed: Aug. 13, 2004

(65) Prior Publication Data

US 2006/0036476 A1 Feb. 16, 2006

(51) Int. Cl.
*G06Q 10/00* (2012.01)
*G06Q 20/00* (2012.01)
*G06F 17/00* (2006.01)
*G06Q 10/08* (2012.01)
*G06Q 20/20* (2012.01)

(52) U.S. Cl.
CPC ............ *G06Q 10/087* (2013.01); *G06Q 20/203* (2013.01); *Y10S 707/99931* (2013.01); *Y10S 707/99942* (2013.01); *Y10S 707/99945* (2013.01); *Y10S 707/99954* (2013.01); *Y10S 707/99955* (2013.01)
USPC ............... 705/28; 707/999.001; 707/999.101; 707/999.104; 707/999.203; 707/999.204; 705/22; 715/229; 715/230

(58) Field of Classification Search
USPC ................. 715/206, 853, 764, 781, 230, 704; 358/1.13; 707/999.01, 999.203; 705/1, 705/10, 1.1, 4, 9
See application file for complete search history.

(56) References Cited

U.S. PATENT DOCUMENTS

| | | | | |
|---|---|---|---|---|
| 5,870,746 A * | 2/1999 | Knutson et al. | ......................... | 1/1 |
| 5,923,328 A | 7/1999 | Griesmer | ...................... | 345/357 |
| 5,977,971 A | 11/1999 | Guzak et al. | ................... | 345/340 |
| 6,496,208 B1 * | 12/2002 | Bernhardt et al. | ............ | 715/853 |
| 6,496,842 B1 * | 12/2002 | Lyness | ........................... | 715/206 |
| 6,668,253 B1 * | 12/2003 | Thompson et al. | ................... | 1/1 |
| 7,062,536 B2 * | 6/2006 | Fellenstein et al. | ........... | 709/206 |
| 7,107,298 B2 * | 9/2006 | Prahlad et al. | ................ | 707/640 |
| 7,493,591 B2 * | 2/2009 | Charisius et al. | ............. | 717/100 |
| 7,546,317 B1 * | 6/2009 | Kaptelinin | ......................... | 705/6 |
| 7,603,618 B2 * | 10/2009 | Mori et al. | ..................... | 715/229 |
| 2002/0075293 A1 * | 6/2002 | Charisius et al. | ............. | 345/704 |
| 2002/0077842 A1 * | 6/2002 | Charisius et al. | ................. | 705/1 |
| 2002/0078432 A1 * | 6/2002 | Charisius et al. | ............. | 717/102 |
| 2002/0184250 A1 * | 12/2002 | Kern et al. | ..................... | 707/204 |
| 2002/0188597 A1 * | 12/2002 | Kern et al. | ......................... | 707/1 |
| 2003/0009357 A1 * | 1/2003 | Pish | ................................... | 705/4 |
| 2003/0023473 A1 * | 1/2003 | Guyan et al. | ...................... | 705/9 |
| 2003/0074090 A1 * | 4/2003 | Becka et al. | ...................... | 700/83 |
| 2003/0145124 A1 * | 7/2003 | Guyan et al. | .................. | 709/318 |
| 2004/0039629 A1 * | 2/2004 | Hoffman et al. | ................ | 705/10 |
| 2004/0167941 A1 * | 8/2004 | Prahlad et al. | ................ | 707/204 |
| 2004/0172409 A1 * | 9/2004 | James | ........................ | 707/104.1 |
| 2004/0193639 A1 * | 9/2004 | Bergman et al. | .......... | 707/103 R |
| 2004/0225730 A1 * | 11/2004 | Brown et al. | .................. | 709/224 |
| 2005/0149376 A1 * | 7/2005 | Guyan et al. | ...................... | 705/9 |
| 2005/0257136 A1 * | 11/2005 | Charisius et al. | ............. | 715/511 |
| 2006/0036476 A1 * | 2/2006 | Klem | ................................ | 705/7 |
| 2006/0176498 A1 * | 8/2006 | Wada et al. | .................. | 358/1.13 |

* cited by examiner

*Primary Examiner* — Matthew Gart
*Assistant Examiner* — Olusegun Goyea
(74) *Attorney, Agent, or Firm* — Susan L. Crockett, Esq.; Crockett & Crockett, PC

(57) ABSTRACT

A system and method for tracking information in a business environment. The system uses a tree-view hierarchy whereby alerts and time triggers are set by the user and upon the triggering of an event, the visual attributes of the tree-view folders change to reflect the triggering event.

13 Claims, 7 Drawing Sheets

Production Group

Company

Alphabetical

Fig. 7a

[Screenshot of "Labor Codes - TracKing" window showing Labor Sections tree (All, Unassigned, Suspension, Brakes, Shocks/Springs, Wheels/Tires, Engine, Electrical, Interior, Exterior) labeled 42, and a list of Labor Codes:]

| Labor Code | Description | Hours | Amount | Type |
|---|---|---|---|---|
| 01010203 | Clean case halves and all reused components | 1.00 | $50.00 | Reg |
| 01010204 | Assemble crank | 0.50 | | Reg. |
| 01010205 | Assemble case havles | 0.17 | | Reg. |
| 01010206 | Assemble top end | 2.00 | | Reg |
| 01010207 | Set end play and adjust valves | 0.50 | | Reg. |
| ENGINE | test for engine section | 2.30 | | Reg. |
| SHORTBLOCKT1 | Clean, Machine, Assemble Crank & Short block | - | $175.00 | Kit |

Labor Kit Contents

| Labor Code | Description | Hours | Amount |

| Product | Description | Quantity | Price |

Fig. 7b

[Views dropdown menu showing: Company, Amount, Hours, ✓ Product]

Fig. 7c

[Labor Code 01010203 dialog with labels:]
- 43 — Labor Code
- 45 — 01010203
- 44 — (close)
- 46 — Description: Clean case halves and all reused components
- 48 — Format: Flat Rate
- Hours: 0.75
- Amount: $75.00
- Disclaimer 1: Case T1
- Disclaimer 2
- 47 — Read Only
- 49
- 50 — Problem
- 51 — Cause
- 52 — Remedy
- 53 — Remark

SYSTEM AND METHOD FOR TRACKING INFORMATION IN A BUSINESS ENVIRONMENT

FIELD OF THE INVENTIONS

The inventions described below relate generally to information tracking, and in particular, to a system and method of tracking information in a business environment.

BACKGROUND OF THE INVENTIONS

Tracking business information is critical to a successful business enterprise. However, tracking can be time consuming and confusing. If the appropriate information is not tracked properly or if it is confusingly displayed, it accomplishes nothing or defeats it own purpose. A system for tracking information in a visually clear and meaningful way is desired.

SUMMARY

The software and system described below provide for visual indications of the progress or status of any number of tasks, events or conditions in a business enterprise on a computer display which includes the typical hierarchical folder tree view. The typical hierarchical folder tree view is modified so that parent folders can be used to store documents, executable code, databases and other folders which have attributes that affect the visual attributes of the parent folders. The attributes include time triggers and deadlines, event alerts, and the like. The visual attributes of the parent folders are altered in response to conditions of the items contained within the folders and subfolders. The system is illustrated in the environment of a business which engages in the typical activities of production, including final products and intermediate products (production subassemblies or in-house products) which are time-critical, sales and shipping of end-products to customers, labor consumption, and purchasing of inventory and supplies.

The production area of the program allows the user to visually monitor and thereby manage the organization's production process and timeliness. Both the categorical containers (Tree View Folders) and the production subassembly documents (in-house products or IHP documents) contained within the folders have timing attributes that are user-definable. The IHPs consist of user-defined tasks and the time attributes of those tasks by which triggers are set off once the desired amount of time has elapsed. Once that trigger is activated, the visual attributes of the IHP and the tree view folder it resides in and its parent folders may change. For example, it may be desirable to complete a certain critical production subassembly by a certain date, or it may be desirable to maintain a certain minimum number of critical production subassemblies on hand, so that a critical subassembly document will have a time trigger which alters the parent folder if it is not completed by a specified date, or an inventory trigger if the number on hand falls below (or above) a specified amount.

The Sales area of the program allows the user to visually monitor and thereby manage all sales invoices and their timeliness. A tree view control is employed, similar to that described in the production area of the program. Each of the user defined tree view folders have customizable time triggering attributes associated with them as well as the ability to not allow invoices to be placed within them. For example, sales invoices which have not been altered to indicate that the invoiced product has shipped to a customer within a specified time period, and the invoice will have a time trigger which alters the parent if it has not been altered to indicate shipment.

The Products area of the program provides a user interface with products in the Inventory database. It allows the user to search, view, filter, edit, create, and delete products in the database as well as issue them to invoices. This screen is accessible from multiple areas of the program and allows a user to add products when called from an open invoice.

The Labor Codes area of the program provides a method of categorizing and setting up codes for each labor operation or group of labor operations. The views drop down provides different categories for viewing the labor codes.

The Orders, or purchasing section of the program, consists primarily of two sections: tracking orders and building orders. The Orders Main Screen allows the user to view and interact with Purchase Orders and Quotes. It also allows the user to set the "Ordered Status" for assigned Purchase Orders. It also tracks Receipts Entry Validation of Orders received from vendors. The Order Builder is used for building Purchase Orders and Quotes, monitoring inventory levels and dynamic sales cycles of each individual product, and recommending product replenishment and vendors based on historical data and user defined purchasing preferences.

BRIEF DESCRIPTION OF THE DRAWINGS

FIG. 7a illustrates a sample shot of the Labor codes screen for the tracking system.

FIG. 7b illustrates a sample shot of the Labor code Views drop down screen for the tracking system.

FIG. 7c illustrates a sample shot of the labor code detail screen for the tracking system.

DETAILED DESCRIPTION OF THE INVENTIONS

Figure 1:
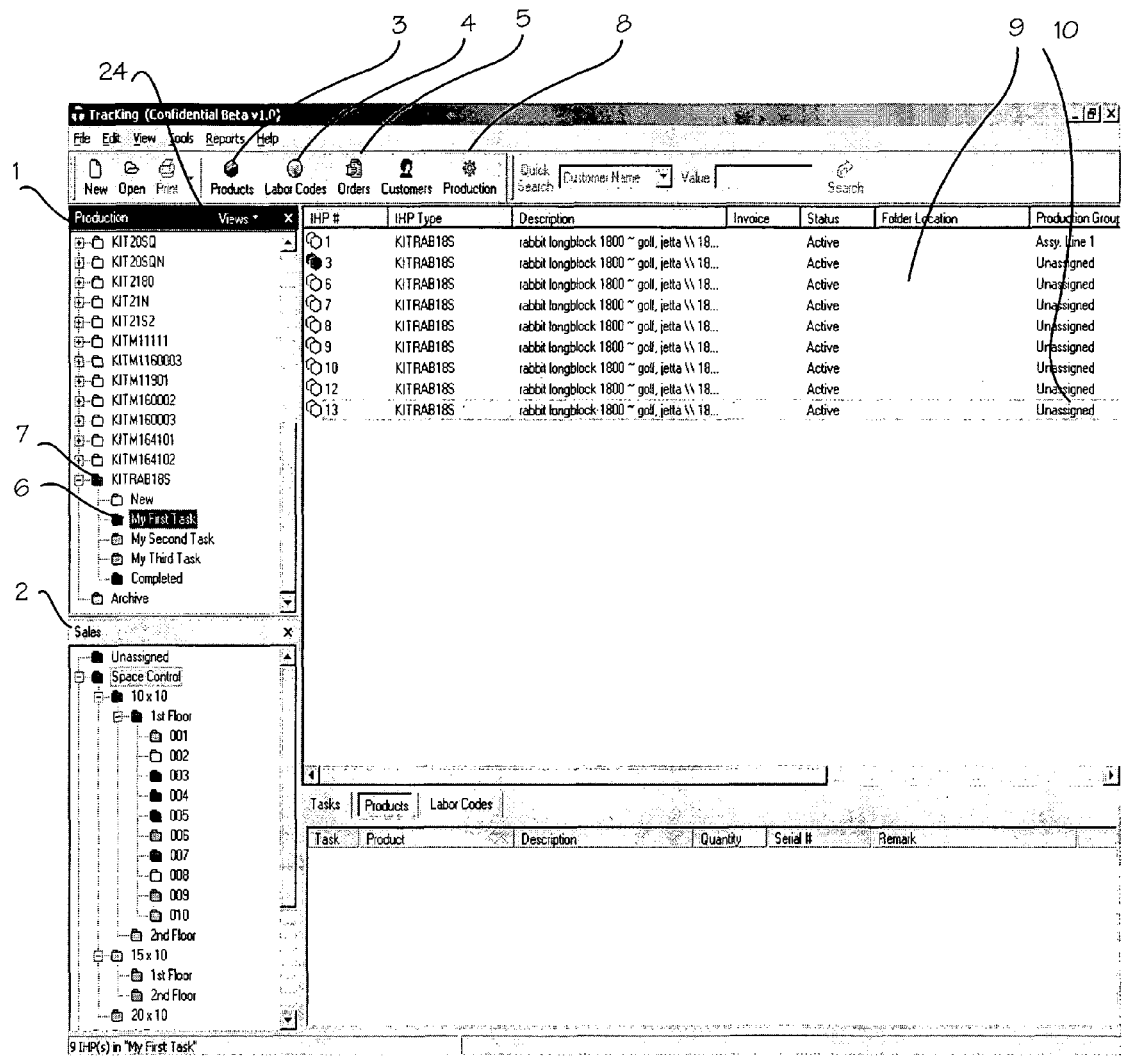
FIG. 1 illustrates a sample shot of the main screen for the tracking system.

The main menu, as shown in FIG. 1, allows the user access to five main program sections for monitoring and managing a business enterprise. The "Production" panel 1 allows the user to visually monitor and manage production processes and their timeliness. The production panel is selected with production view selector button 8. A similar window provided upon selection of the "Sales" icon 2 allows the user to visually monitor and manage sales, invoices and their timeliness. A window provided upon selection of the "Products" icon 3 allows the user to manage inventory. A window provided upon selection of the "Labor Codes" icon 4 allows the user to manage labor operations. Finally, a window provided upon selection of the "Orders" icon 5 allows the user to manage orders and quotes. The main menu also provides for various other standard functions, including printing, searching the databases, opening other databases, and creating new databases.

Production

The production area of the program allows the user to visually monitor and thereby manage the organization's production process and timeliness. A tree view control is provided which enables the program to display a hierarchical list of items. The tree views are able to collapse and expand by clicking on the "−" or the "+" in the tree views respectively. This system makes the visual management of many categories simple. The tree view control is manifested as child folders within a parent folder. For example, the folder 6, labeled "my first task," is a child folder of the parent "KITRAB185", 7. The tree view control is child driven. As such, the tree view control sends notification messages to the parent folder when events occur within the child folder.

The contents of the child folder comprise single products, kits, or "in house products." A single product is an individual product. A kit is a group of products. An "in house product" (hereinafter IHP) is a product that a company manufactures that has specific tasks that lead to its completion.

The Production Area of the program tracks the time that is spent on each IHP task. Because not all sections of a business enterprise operate 24 hours per day, the entire production system may be turned on or off and the individual IHP timers may be turned on or off, either manually or automatically. The user turns the entire production system on or off from the Main Screen by clicking the "Production" selector button 8. The color of the production button icon indicates the status of the production system: green indicates that the production system is currently running and red indicates that the production system is currently stopped. The user turns an individual IHP timer off from the content pane 9 by right clicking on the specific IHP 10 and selecting "deactivate." The user turns an individual IHP timer on from the content pane by right clicking on the specific IHP and selecting "activate."

Time triggers are associated with the IHP and/or parent folders. Triggers are activated by placement of an IHP document within a folder while production is running and the IHP is activated. Time triggers may be set for both the parent folders and the IHPs depending upon the view that the user has selected in the production tree view.

Alerts, or customizable folder attributes, are used to alert the user that an IHP has triggered its time trigger. The alert will typically comprise a change in the color, size, animation, or other visual attribute of the folder, but may also include audible and textual information associated in any manner with the folder. The production folders are cascading so that when a child folder has an IHP that has triggered its user-defined time rule, the parent's icon changes color or image correspondingly. Using this method allows system users to have every production tree view collapsed, and yet still be alerted to the fact that there is trouble with a single IHP. The user can click down through the folders to find the root cause of the problem and then correct the problem before it affects a dependant process. Alerts can be made by Clicking "Tools," "Options," "File Structure."

In use, alert interval times are established for each IHP task. When the IHP timer is greater than or equal to the alert interval time, the program activates the alert, or customizable folder attribute. For example, the parent folder changes color from green to red. The alert, or customizable folder attribute, may also be an audible tone.

Each parent folder's visual (or audible) representation is dependant upon the state of the child folders and their contents. If the child folder has an IHP document placed within it that has exceeded any time trigger that has been set for it or designated for the folder itself, the visual representation changes for both the child folder and its parent folder(s). In our example, both the child folder and the parent folder turn red to indicate to the user that a problem has occurred. The folders also indicate by the visual representation if there is anything that resides within them. For example, all empty folders are white, folders with on-time tasks are green and folders with untimely tasks turn red at the instance of the untimely event. Any color and/or any graphical representation may be used. The icons hierarchy and text labels used to describe them are user definable in both the "company view" and the "production group" view, described below with regard to FIG. 3.

The time triggers for the tree view folders may be set from the Main Screen by clicking "Tools" pull-down menu, and selecting submenus "Options," "File Structure," "Production."

The time triggers for an IHP may be set from the Main Screen by right clicking on (or otherwise selecting) any existing IHP document, selecting "Go to Product" (which will bring up the Products Screen), and clicking on the "IHP Contents" button. The user can also click "Products" and search for the IHP he would like to edit, or create a new IHP by selecting the "New, Drop Down," "IHP" buttons.

The content pane 9 displays documents corresponding to IHPs that are currently being produced. By clicking the Production Tree view folders, the user can view the IHPs that exist within. Each IHP, the products that comprise it and the time that is spent producing it are uniquely identifiable. The user creates a new instance of an IHP in the content pane by right clicking in the content pane, and selecting "New."

Figure 2:
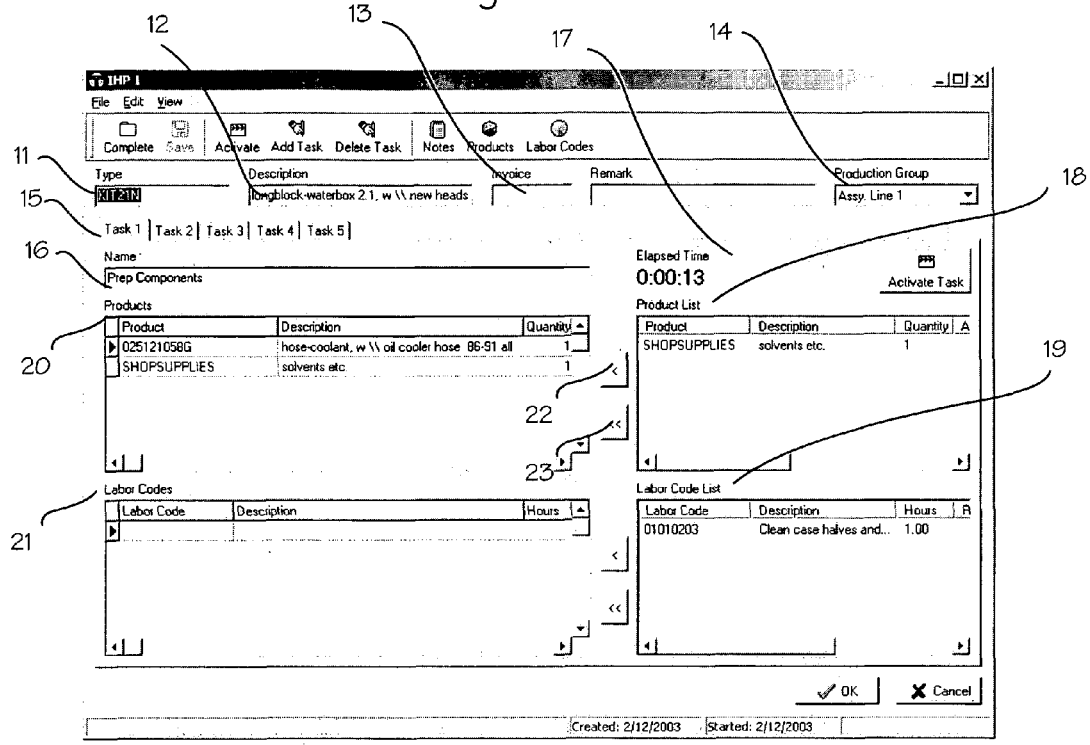
FIG. 2 illustrates a sample shot of the IHP Process screen for the tracking system.

The IHP Process Screen, as shown in FIG. 2, allows the user to interact with the IHP while the IHP is being produced. The IHP Process Screen is available by double clicking on any IHP in the content pane of FIG. 1. It enables the user to add products, labor codes, notes, etc. to each independent task and allows the user to advance the product to another task.

The Type field 11 shows the unique naming convention that has been given to the IHP. The Description field 12 provides an explanatory description of the IHP. The invoice field 13 allows a user to identify the invoice (if any) associated with the IHP. This number can be assigned when the IHP is issued to an invoice, allowing an individual to track its progress and estimated completion time. The production group of an IHP can be set via the Production Group drop down 14. The production group selected effects the Production Group view, described below with regard to FIG. 3a. The production group enables a specific product to be categorized in a specific Production Group without any additional work except creating its instance. The Tasks Tabs 15 reflect the tasks that were set up when the IHP was created and the IHP contents were added. Each task has assigned time triggers. These triggers are set up as a guide for the nominal time the task should take, and are used to control the visual representation for the IHP in the content pane and the folders in the Production Tree view. By clicking on a Task Tab 15, the user can view all of the detailed information for a specific task (such as task one, entitled "Prep Components"). Name 16 is the text label given to that specific task when it was built or edited in the "IHP Contents Window." Elapsed Time 17 is the time that has been spent on that task to date. Product List 18 shows the products and/or product arrays that have been predefined as possible products used in the task selected. Labor Code List 19 shows the labor codes that have been predefined that could possibly be used in the task selected. Products 20 are the actual products used in the task. Labor Codes 21 are the actual labor codes used to complete the task.

The "Add" 22 button allows the user to add selected products from the suggested product list to the Actual IHP task the user is currently on. When a product array is added from either the Add or Add All buttons 23, an alert window will display that allows the user to select which product(s) from the array he would like to use. There is also a default product that will automatically be selected, if pre-designated, when the IHP Contents were originally created to expedite the more common selections.

Three selectable views are available for the Production pane of FIG. 1, which may be selected to suit the user's monitoring needs: production group view, company defined view, and alphabetical view. The user selects the desirable view by means of the views drop down menu 24, shown in FIG. 1. Each View has its own method of handling the triggers associated with it.

Figure 3A:
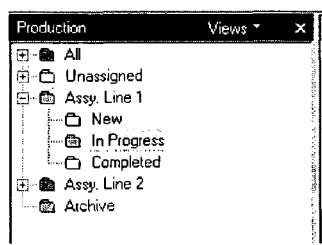
FIG. 3a illustrates a sample shot of the Production Group view from the views drop down menu.

The Production Group View, as shown in FIG. 3*a*, provides for a user-defined categorical grouping system based solely on whichever group the IHP was pre-designated to belong to. The pre-designation is set when the IHP is created or edited in the Products section of the program, described below. The "production group" drop down 14 is accessed by double clicking on any currently existing IHP, as shown in FIGS. 1 and 2. The time triggering attributes are set exclusively by the IHPS that exist in the folders. The example in FIG. 3*a* shows two assembly lines. The Red folder color in "Assy. Line 2" indicates that there is an IHP that has exceeded the alert interval time designated for one of its tasks. To view the cause the user could click on the "+" or double click the folder icon.

The coloration of the folders in the Production Group View (FIG. 1) is based on the time triggers set for the IHPs within it. Time triggers may be set for each specific step to create the IHP (see Task tabs of FIG. 2). IHPS, for example, may be assigned time triggers as follows: Widget 1: [step1 10 min], [step 2, 5 min], [step 3, 1 hour]; Widget 2: [step1 40 min], [step 2, 5 min], [step 3, 5 min], [step 4, 1 hour], [step 5, 10 min]. The user can set up his own custom categories that can contain different IHPs with different tasks, while still using the IHP's time triggers. The user sets up the top level category, for example, "Assembly Line 1". The system then automatically sets up the "new", "in-progress" and "completed" folders that are contained within the parent. No other customization can be done with regard to the folder structure in the production view. If the IHP is an automatic product (defined when created) then the product automatically is put in the "In-progress" folder. If the IHP is not automatic, then it gets put into the new folder where it is queued for production until the user is ready to start the process. This method allows a single assembly to build different IHPs and yet lets the user monitor the assembly line's progress.

Figure 3B:
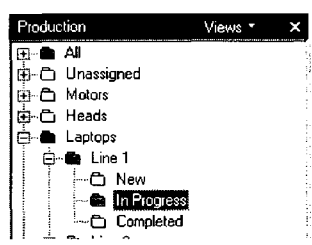
FIG. 3b illustrates a sample shot of the Company view from the views drop down menu.

The Company Defined View, as shown in 3*b*, provides for a user-defined categorical grouping system that is not IHP defined. Any label can be used for any folder or subfolders. Any IHP may be put into any folder to be tracked. Each folder created has its own alert interval attributes that are invoked when an IHP is placed in the folder. The text labels, hierarchy and the timing attributes are adjustable from the main screen by clicking "Tools," "Options," "File Structure," "Production." FIG. 3*b* shows that an IHP in the Laptops/Line1 folder has fallen behind schedule, as indicated by the red "In Progress" folder. The user pre-defines the times that the alerts are set to go off for each folder. This method of viewing production uses only the folder alerts. It is completely customizable and any IHP can be put into any folder. The alerts on the folders are the only thing governing the coloration of the folders. The IHP time triggers are not being used.

The Company Defined View uses only the folder alerts. It is completely customizable and any IHP can be put into any folder. The alerts on the folders are the only thing governing the coloration of the folders. The IHP time triggers are not being used.

Figure 3C:
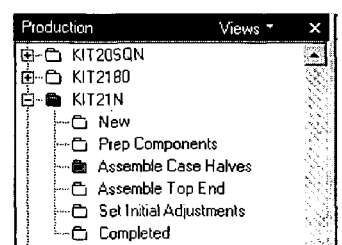
FIG. 3c illustrates a sample shot of the Alphabetical view from the views drop down menu.

The Alphabetical View, as shown in FIG. 3*c*, provides for an alphabetical listing based on the IHPs that exist in the database. The example above shows that the IHP "KIT21N" has six child folders of which four are defined tasks. The second task "assemble case halves" is currently behind schedule as indicated by the red folder. Each IHP task has its own user definable timing trigger. This view is displayed alphabetically by IHP. Every defined task in the IHP's creation is represented by a folder and its visual status is dependant upon the IHP time trigger set for each defined task.

Sales

The Sales area of the program allows the user to visually monitor and thereby manage a user definable categorical breakdown of all sales invoices and their timeliness. A tree view control is employed, similar to that described in the production area of the program. Each of the user defined tree view folders have customizable time triggering attributes associated with them as well as the ability to not allow invoices to be placed within them. For example, sales invoices which have not been altered to indicate that the invoiced product has shipped to a customer within a specified time period, and the invoice will have a time trigger which alters the parent if it has not been altered to indicate shipment. These properties are set from the Main Screen by clicking "Tools," "Options," "File Structure."

The icons in the Sales Pane indicate the timeliness of the Invoices that are contained within the Sales Pane using alerts or color attributes similar to those previously described under Production. The icons are user definable and should be set up to best illustrate the user's business sales processes or categorical hierarchy. Changes to the structure can be made by Clicking "Tools," "Options," "File Structure."

Figure 4:
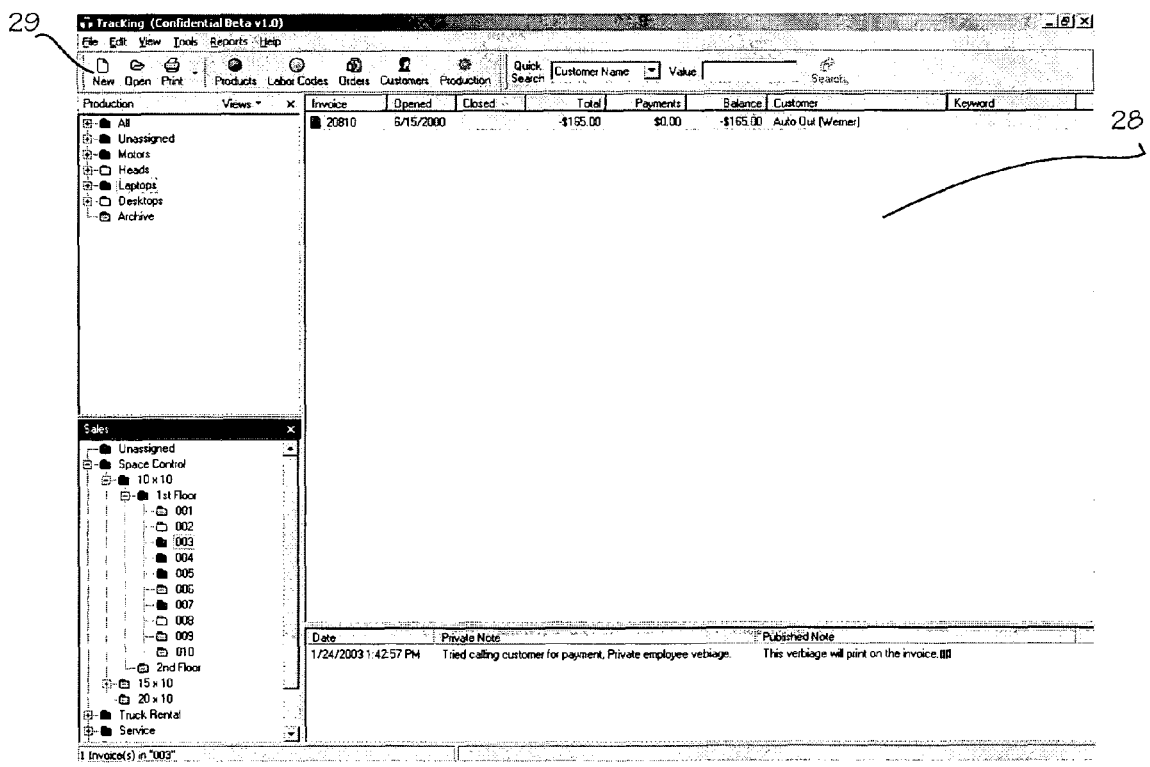
FIG. 4 illustrates a sample shot of the Sales screen for the tracking system.

FIG. 4 provides an example of a hierarchical breakdown of company sales. For example, FIG. 4 lists the storage units that are available and used at a storage rental company. The currently selected icon is for unit 003, which is a 10'×10' on the first floor. The customer is "Auto Out (Werner)" specified in the content pane 28. The invoice has exceeded a time trigger that was previously set for the 003 folder in the tree view indicated by the red coloration. Folders 004, 005, and 007 are also past due and 002 and 008 are not occupied represented by the white coloration.

New invoices may be created. To create a new invoice, the user clicks anywhere in the Sales Pane. The top of the Sales Pane will turn blue. The user then presses the "New" button 29 at the top of the main form, which will lead the user through a series of menus to look up an existing customer or enter a new one and allow the user to enter both products and labor depending on the type of business.

Products

Figure 5:
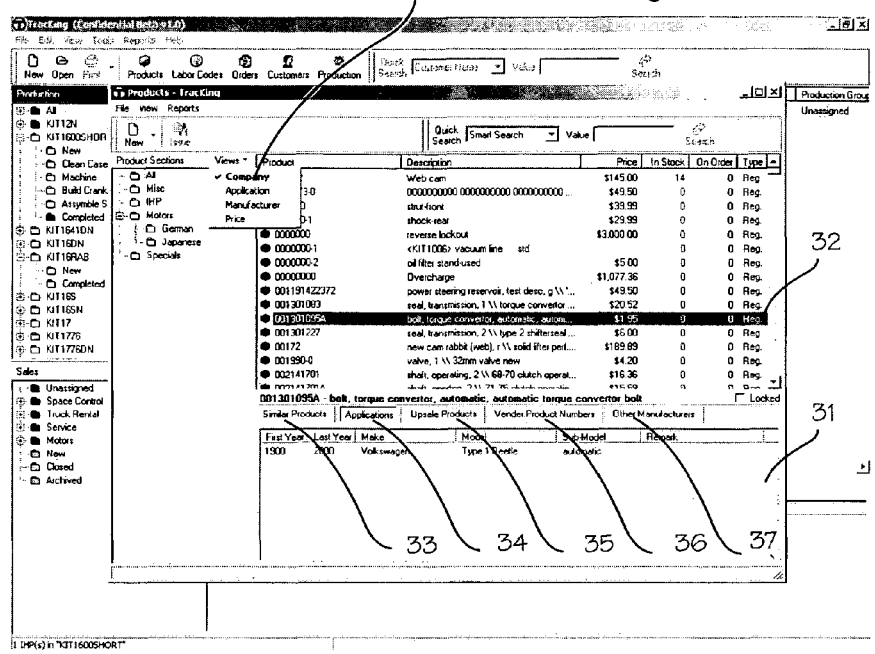
FIG. 5 illustrates a sample shot of the Products overview screen for the tracking system.

The Products area of the program, as shown in FIG. 5, provides a user interface with products in the inventory database. It allows the user to search, view, filter, edit, create, and delete products in the database as well as issue them to invoices. This screen is accessible from multiple areas of the program and allows a user to add products when called from an open invoice.

The views drop down 30 provides different categories for viewing the products. Four views are provided: company, application, manufacturer and price. "Company" allows the user to customize the categorical view of all products sold using any verbiage or structure the user desires. "Application" lists the products based on the application the user has established for individual products. Multiple applications are allowed and are editable to meet any company specific verbiage. "Manufacturer" lists the products based on the product's manufacturer. "Price" lists the products based on grouped sets of prices. The groups are generated dynamically by price ranges of the products to reduce the number of categories. For example if a company sells mostly products from $5,000 to $10,000 range the system will set up categories based on those ranges and not smaller (i.e. $10 to $100.00 range).

Figure 6:
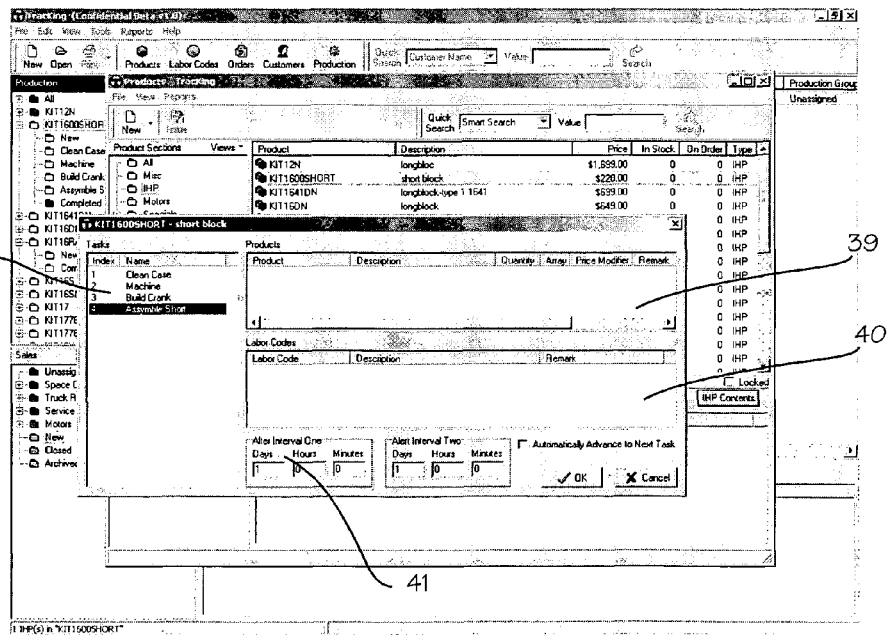
FIG. 6 illustrates a sample shot of the IHP Builder Form screen for the tracking system.

Three types of products are housed in the Products database. "Single Product" refers to an individual product. "Kits" are individual products that can be grouped by issuing a Single Kit Product. "In House Product" or IHP refers to a grouping of tasks required to manufacture a single product sold by the user. Those tasks contain products or arrays of products that are used to manufacture the new product for sale. The tasks also may include labor codes and costs for each individual task. When a user selects an IHP from the content pane, an additional button "IHP Contents" will become visible in the detail pane. By clicking this button, the user will be able to see and edit the Tasks, Products, and Labor Codes that are associated with the IHP, as shown in FIG. 6.

The products detail pane 31 provides additional information about the product selected in the products content pane 32. There are five persistent tabs and one additional tab that are only visible when a Kit is selected: similar products, applications, up-sale products, vendor products numbers and other manufacturers.

The Similar Products Tab 33 is used to associate other products in the database that may be very similar to the product the user has selected and could be used as well. Applications 34 defines when a product is to be used, for example, when a replacement product can only be used for a specific time period or may only fit a certain type of vehicle or type of another product category. Up-sale Products 35 are products that go with or are an enhancement to the product being sold. If a product is issued to an invoice that has an up-sale product associated with it, the User will be alerted to that fact by a pop-up screen which will tell the user exactly what it is and why the customer needs it. This method allows a salesperson to generate additional sales based on the product(s) from which a customer is interested. Vendor Product Numbers 36 show the vendor specific part numbers for a product listed in the database. Typically, different vendors may have different product numbers for the same product. The program allows the user to establish its own proprietary numbering system. By doing so, the user can associate and order products from the vendors using their own part numbers. Other Manufacturers 37 show other products in the system, which are exactly the same products but made by different manufacturers.

Kits are used to issue a single product number yet have multiple products issued to an invoice. The Kit Contents area, as shown in FIG. 6, lists all user-defined product members of the Kit selected. Single products and or product arrays may be included. A product array is a list of products that the user will be able to select and issue to an invoice. A kit is a group of products that can be issued all at once by issuing a single KIT Part number. Any one of the parts in the kit could be a "Product Array" part, meaning that one of the products in the array will be used, but the user does not necessarily know which. For example, the user could sell a clothing outfit together as a kit wherein the shirt could be blue, black or white. The shirt could be a product array within the kit, and when the kit is issued to the invoice the user would be asked via a pop-up window which color shirt the customer is buying. This section of the program allows the user to not only set up a group of parts to issue but an array for any one of the members that the user can select from. For example, the program allows the user to pick a set of parts as a default, but also allows the user to pick from the others that could have been used (in the array).

The IHP Builder Form, as shown in FIG. 6, is used to define the Tasks, Products, Labor Codes, and Alert intervals for any In-House Product. When a Task is selected in the Task Pane 38, the Products that are associated with that task appear in the Products Pane 39. By right clicking in the Task Pane of the IHP Builder form, the user can add, edit, delete, or rename a task. The user can add a product by right clicking in the Products pane. When a Task is selected in the Task Pane, the Labor Codes that are associated with that task appear in the Labor Codes Pane 40. The user can add a labor code by right clicking in the Labor Codes Pane. The Alert Intervals field 41 may be adjusted for each individual task. These Alerts are used in the Production area of the program to alert a user to a task that is taking too long to perform. There are two alerts shown in this illustration: one changing the folder color to yellow and the second changing it to red. The user inputs the amount of time before the user would like the system to alert all users that the task has exceeded the specified amount of time. Multiple alerts can be employed or just a single alert.

Labor Codes

The Labor Codes area of the program provides a method of categorizing and setting up codes for each labor operation or group of labor operations. The views drop down provides different categories for viewing the labor codes.

The Labor Tree view 42, as shown in FIG. 7a allows the categorical breakdown of all labor operational codes. The All folder in the Labor Tree view is used to show every labor code within the system. No matter how the rest of the folders are set up, the "All" Folder will always show all of the labor codes. The "Unassigned" Folder is used to show the labor codes that have not been assigned (dragged and dropped) into a user-defined category.

The Labor "Views," as shown in FIG. 7b, can be selected by clicking on the "Views" drop down in the Labor Codes Window. Four views are provided: company, amount, hours and products. "Company," which is the default view, allows the user to customize the categorical view of all labor codes using any verbiage or structure the user desires. "Amount" categorizes the labor codes based on their price range. The price ranges of the folders, and the quantity of folders shown, are dynamically adjusted to best fit the range of prices that the labor codes use. "Hours" categorizes the labor codes based upon the times that are assigned to the labor codes. The time ranges of the folders, and the quantity of folders shown, are dynamically adjusted to best fit the range of hours used in the labor codes. "Product" categorizes the labor codes based upon labor codes that have products associated with them.

The Labor Content Window, as shown in FIG. 7c shows the contents of the folder the user has selected in the Labor Tree view. The user may edit the codes by right clicking anywhere in the Labor Content Window and selecting the option, or by double clicking on any labor code in the Labor Content Window. Double clicking will automatically bring up the Labor Code Detail Window, as shown in FIG. 7c.

The labor code detail window, as shown in FIG. 7c, allows editing of the detailed information about a particular labor code. Eleven fields are provided. Labor Code 43 shows the code assigned to the labor operation. Description 44 shows the description of the labor operation to be used in the description field of the invoice and on forms. Format 45 shows the type of labor charge. It can be a flat rate or hourly based. Flat Rate provides a fixed amount for a particular labor operation. Hourly provides for billing by the hour for a labor operation. Hours 46 shows the amount of hours it will take for the labor operation. Amount 47 is the total amount that the labor operation will cost. Disclaimer 1 48 is a predefined disclaimer to be printed on the customers invoice. Disclaimer 2 49 is a predefined disclaimer to be printed on the customers invoice. Problem 50 provides an area for the User to list the original problem encountered. Cause 51 provides an area for the user to list the cause of the original problem. Remedy 52 provides an area for the user to list the actual repair remedy. Remark 53 provides an area for the user to list any custom remarks or details with respect to the labor operation for which there is no other field listed.

Orders

Figure 8A:
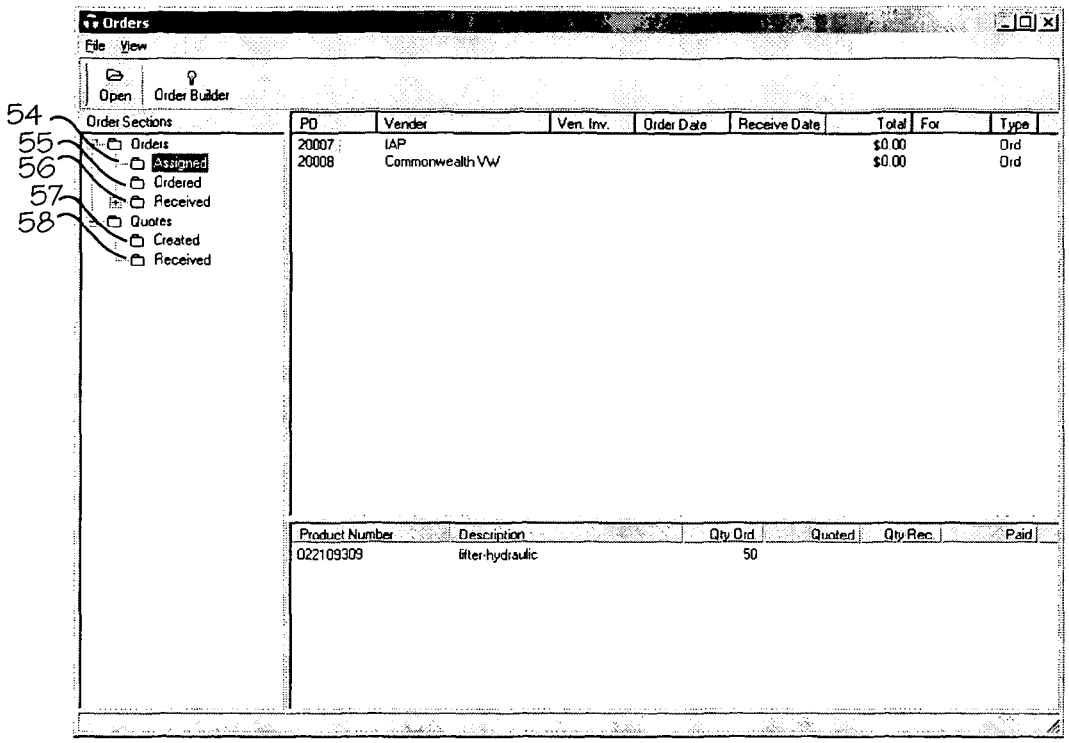
FIG. 8a illustrates a sample shot of the Orders screen for the tracking system.

The orders main screen, as shown in FIG. 8a, is used to view all purchase orders and quotes. It has a categorical tree view that allows navigation of all purchase orders. The orders folder comprises three subfolders. Assigned 54 shows that a purchase order has been assigned to the order but the order has not been submitted to the vendor. Ordered 55 shows that a purchase order has been submitted to the vendor and the products have not been received. Double clicking on any order in the "Ordered" category will bring up a form allowing the user to enter receipts (a system of reconciling product quantities, part numbers, and prices received from the vendor for that purchase order). Received 56 shows all purchase orders that were received and reconciled.

The Quotes folder comprises two subfolders. Created 57 shows all quotes created in the Order Builder that may or may not have been submitted to a vendor, and have not been received back with price quotations from the vendor. When a quote is received back with price quotes from the vendor, the user may double click on the quote in the "Created" folder. The Quote Data Entry window will open, allowing entry of the quotes and the updating of the vendors prices in the database for those products for future consideration when the Order Expert is making decisions on which vendor to suggest for the purchases. Received 58 shows all quotes that have been received back from Vendors.

Figure 8B:
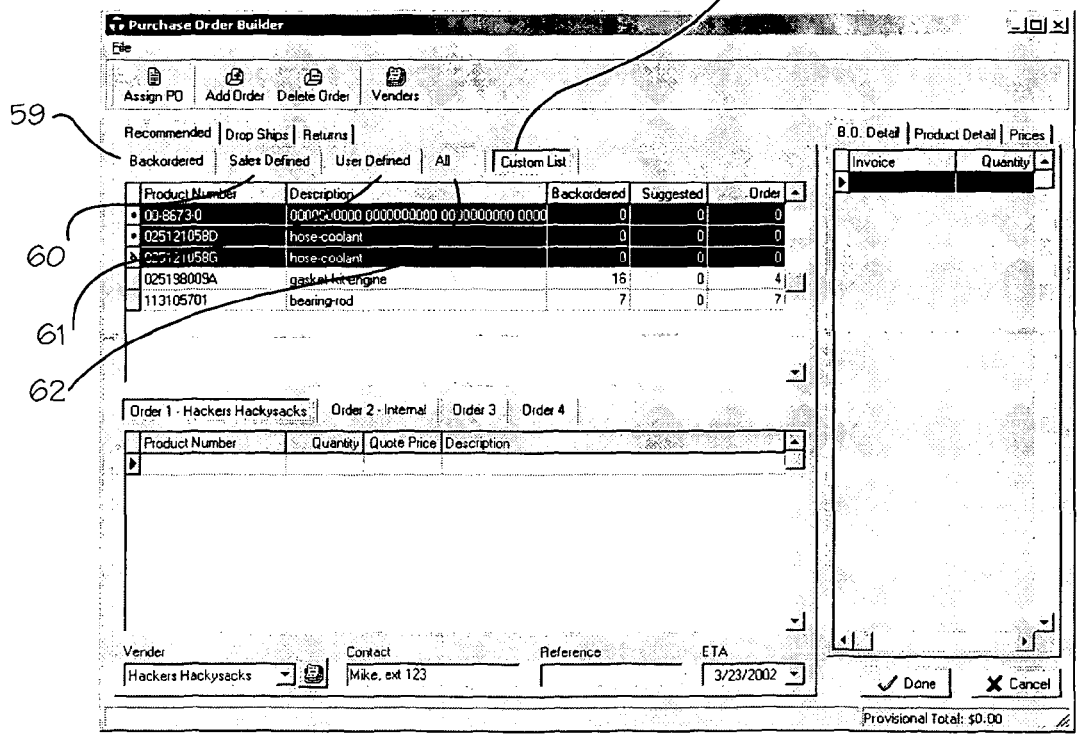
FIG. 8b illustrates a sample shot of the Purchase order builder screen for the tracking system.

The Order Builder, as shown in FIG. 8b, is an area of the program that allows Purchase Orders to be compiled. The program assimilates all of the inventory, vendor, and user-defined statistics and mathematically generates and categorizes recommended purchases based on both pre-set and user defined criteria. Backordered 59 are parts that have already been issued to invoices but are not currently in stock. Sales Defined 60 are parts that are recommended from dynamic sales cycles and inventory calculations including aging, movement, and margin. User Defined 61 are parts that are recommended by the user defined re-order quantity levels which are set in the Products area of the program. All 62 is an area that allows the user to see all of the recommended products for purchase.

Figure 8C:
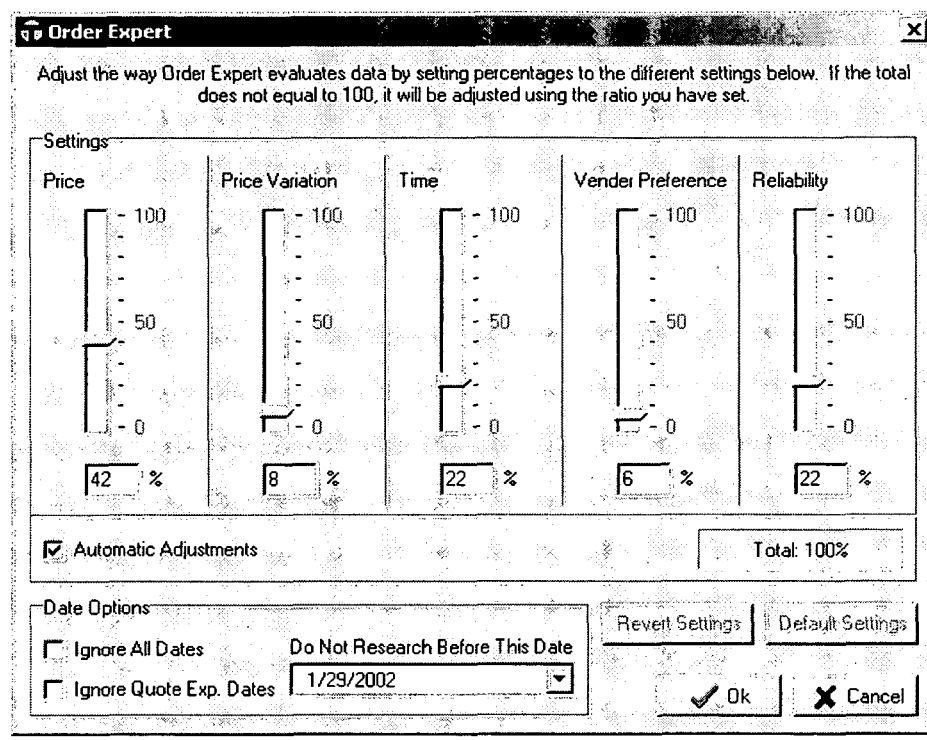
FIG. 8c illustrates a sample shot of the order expert screen for the tracking system.

Custom List 63 is an area where the user can move recommended products to and from any other Sub Tabs within the Recommended Tab. Once the parts are there, the user can assemble orders manually or select products for which the user would like the Order Expert to generate orders. The preferences are user defined in an equalizer type interface that self adjusts, as shown in FIG. 8c. Once the user highlights the parts the user wants the Order Expert to analyze, the user right clicks and selects "Order Expert." The form-illustrated in 8c will display allowing the user to adjust the purchasing criteria. The Order expert allows the user to adjust purchasing criteria when building an order. Preferences are set for price, price variation, time, under preference, reliability.

We have described a method for tracking and displaying critical operational parameters including time critical tasks, mission critical inventories, significant accounting activities or the like in an operational system incorporating a number of interdependent tasks. The method is implemented on a computer with databases, numerous documents and database entries. A computer display is provided for enabling an operator to establish any number of parent folders to contain any number of folders or documents; child elements, comprising child documents and/or child folders containing child documents associated with the parent folder; and enable the operator to correlate the child elements with a time critical task, critical inventory or accounting activities or the like; associate a time trigger with the time critical task, critical inventory or accounting activities or the like; and enabling the operator to clear the time trigger upon completion of time critical task, critical inventory or accounting activities or the like; and, conditionally, changing an attribute of the parent folder and child element when time triggers are met prior to clearance by an operator. The system enables clearance of a time trigger by altering a child element prior to the expiration of the time trigger and/or deleting or moving a child element from the parent folder prior to the expiration of the time trigger. The system enables the operator to provide a visual label to the parent folder to correlate the parent folder to a recognized operational activity such as production, receiving, shipping, accounts receivable or the like; and to provide visual labels to child elements to correlate the child element to recognize elements of production, receiving, shipping, accounts receivable or the like. Visual labels applied to child elements may correlate the child element to recognized elements of production, receiving, shipping, or accounting.

Thus, while the preferred embodiments of the systems and methods have been described in reference to the environment in which they were developed, they are merely illustrative of the principles of the inventions. Other embodiments and configurations may be devised without departing from the spirit of the inventions and the scope of the appended claims. For example, the folder alerts described herein could be used for any computer application or desk top folder.

I claim:

1. A method for tracking and displaying critical operational parameters including time critical tasks, mission critical inventories, or significant accounting activities, in an operational system incorporating a number of interdependent tasks, said method comprising:
 providing a computer and display;
 programming the computer to accomplish, upon input from an operator, the steps of:
  establishing a parent folder to contain any number of folders or documents;
  establishing a child element, comprising one or more child documents or one or more child folders containing one or more child documents, or any combination thereof, each said child document or child folder being associated with the parent folder;
  correlating the child element with a time critical task, critical inventory or accounting activities;

associating a time trigger with the time critical task, critical inventory or accounting activities;

providing means for clearing the time trigger upon completion of time critical task, critical inventory or accounting activities; and changing an attribute of the parent folder based upon the state of the child element and its contents when time triggers are met prior to clearance by an operator.

2. The method of claim 1 wherein the computer is further programmed to accomplish the steps of:

providing a method of clearing a time trigger by altering a child element prior to the expiration of the time trigger.

3. The method of claim 2 wherein the computer is further programmed to:

provide a visual label to the parent folder to correlate the parent folder to a recognized operational activity; and provide visual labels to child elements to correlate the child element to recognized elements.

4. The method of claim 3 wherein the computer is further programmed to:

provide a visual label to the parent folder to correlate the parent folder to the operational activity of production;

provide visual labels to child elements to correlate the child element to recognized elements of production;

provide means for altering the child elements to indicate that recognized elements of production have been accomplished; and alter the visual attributes of the child elements and the parent folder if the child element is not altered to indicate accomplishment of the correlated recognized elements of production prior to the time trigger.

5. The method of claim 3 wherein the computer is further programmed to:

provide a visual label to the parent folder to correlate the parent folder to the operational activity of receiving;

provide visual labels to child elements to correlate the child element to recognized elements of receiving;

provide means for altering the child elements to indicate that recognized elements of receiving have been accomplished; and alter the visual attributes of the child elements and the parent folder if the child element is not altered to indicate accomplishment of the correlated recognized elements of receiving prior to the time trigger.

6. The method of claim 3 wherein the computer is further programmed to:

provide a visual label to the parent folder to correlate the parent folder to the operational activity of shipping;

provide visual labels to child elements to correlate the child element to recognized elements of shipping;

provide means for altering the child elements to indicate that recognized elements of shipping have been accomplished; and alter the visual attributes of the child elements and the parent folder if the child element is not altered to indicate accomplishment of the correlated recognized elements of shipping prior to the time trigger.

7. The method of claim 3 wherein the computer is further programmed to:

provide a visual label to the parent folder to correlate the parent folder to the operational activity of accounting;

provide visual labels to child elements to correlate the child element to recognized elements of accounting;

provide means for altering the child elements to indicate that recognized elements of accounting have been accomplished; and alter the visual attributes of the child elements and the parent folder if the child element is not altered to indicate accomplishment of the correlated recognized elements of accounting prior to the time trigger.

8. The method of claim 1 wherein the computer is further programmed to accomplish the steps of:

providing a method of clearing a time trigger by deleting or moving a child element from the parent folder prior to the expiration of the time trigger.

9. The method of claim 8 wherein the computer is further programmed to:

provide a visual label to the parent folder to correlate the parent folder to a recognized operational activity; and provide visual labels to child elements to correlate the child element to recognized elements.

10. The method of claim 9 wherein the computer is further programmed to:

provide a visual label to the parent folder to correlate the parent folder to the operational activity of production;

provide visual labels to child elements to correlate the child element to recognized elements of production;

provide means for altering the child elements to indicate that recognized elements of production have been accomplished; and alter the visual attributes of the child elements and the parent folder if the child element is not altered to indicate accomplishment of the correlated recognized elements of production prior to the time trigger.

11. The method of claim 9 wherein the computer is further programmed to:

provide a visual label to the parent folder to correlate the parent folder to the operational activity of receiving;

provide visual labels to child elements to correlate the child element to recognized elements of receiving;

provide means for altering the child elements to indicate that recognized elements of receiving have been accomplished; and alter the visual attributes of the child elements and the parent folder if the child element is not altered to indicate accomplishment of the correlated recognized elements of receiving prior to the time trigger.

12. The method of claim 9 wherein the computer is further programmed to:

provide a visual label to the parent folder to correlate the parent folder to the operational activity of shipping;

provide visual labels to child elements to correlate the child element to recognized elements of shipping;

provide means for altering the child elements to indicate that recognized elements of shipping have been accomplished; and alter the visual attributes of the child elements and the parent folder if the child element is not altered to indicate accomplishment of the correlated recognized elements of shipping prior to the time trigger.

13. The method of claim 9 wherein the computer is further programmed to:

provide a visual label to the parent folder to correlate the parent folder to the operational activity of accounting;

provide visual labels to child elements to correlate the child element to recognized elements of accounting;

provide means for altering the child elements to indicate that recognized elements of accounting have been accomplished; and alter the visual attributes of the child elements and the parent folder if the child element is not altered to indicate accomplishment of the correlated recognized elements of accounting prior to the time trigger.

* * * * *